United States Patent [19]

Vreugdenhil

[11] 4,092,375

[45] May 30, 1978

[54] PREPARATION OF A NON-LINEAR ELASTOMERIC COPOLYMER

[75] Inventor: Arie D. Vreugdenhil, Amsterdam, Netherlands

[73] Assignee: Shell Oil Company, Houston, Tex.

[21] Appl. No.: 619,542

[22] Filed: Oct. 3, 1975

[51] Int. Cl.$^2$ .......................................... C08F 297/04
[52] U.S. Cl. ............................. 260/876 B; 260/836; 260/879
[58] Field of Search ................. 260/876 B, 880 B, 879

[56] References Cited

U.S. PATENT DOCUMENTS

| | | | |
|---|---|---|---|
| 3,322,856 | 5/1967 | Holden et al. | 260/876 B |
| 3,448,176 | 6/1969 | Balas | 260/880 B |
| 3,507,934 | 4/1970 | Minor et al. | 260/876 B |
| 3,562,204 | 2/1971 | Van Breen | 260/876 B X |
| 3,598,884 | 8/1971 | Wei | 260/876 B |
| 3,634,549 | 1/1972 | Shaw et al. | 260/880 B |
| 3,637,554 | 1/1972 | Childers | 260/876 B |
| 3,646,161 | 2/1972 | Marwede et al. | 260/876 B |
| 3,652,724 | 3/1972 | Shimomura et al. | 260/877 |
| 3,686,365 | 8/1972 | Sequeira | 260/876 B |
| 3,753,936 | 8/1973 | Marrs | 260/876 B |
| 3,778,490 | 12/1973 | Hsieh | 260/880 B |
| 3,830,767 | 8/1974 | Condon | 260/876 B |
| 3,953,543 | 4/1976 | Futamura et al. | 260/880 B |
| 3,959,412 | 5/1976 | Oberlin | 260/880 B |

FOREIGN PATENT DOCUMENTS

| | | | |
|---|---|---|---|
| 1,283,327 | 7/1972 | United Kingdom | 260/876 B |

*Primary Examiner*—Wilbert J. Briggs, Sr.
*Attorney, Agent, or Firm*—Dean F. Vance

[57] ABSTRACT

A process is provided for the preparation of branched vulcanizable copolymers having improved green strength.

11 Claims, No Drawings

PREPARATION OF A NON-LINEAR ELASTOMERIC COPOLYMER

BACKGROUND OF THE INVENTION

The invention relates to a process for the preparation of a non-linear, elastomeric copolymer, to the copolymer thus prepared and to articles manufactured from such a copolymer.

One of the major deficiencies of commercially available, solution-polymerized, anionically-initiated synthetic rubbers such as butadiene polymers and styrene/butadiene copolymers, is the poor properties of the uncured black stocks. In particular, the tack and green strength are seriously dificient compared with, e.g, emulsion styrene/butadiene copolymers, which leads to difficulties in factory processing. By green strength is meant the strength of the rubber or compound thereof which has not been vulcanized.

It is an object of the present invention to provide conjugated diene elastomers exhibiting improved green strength while still having an adequate processability and satisfactory properties of the vulcanized compound.

Now, in accordance with the present invention a process is provided for the preparation of a non-linear, elastomeric copolymer, which process comprises:

(a) polymerizing a conjugated diene in the presence of a polymerized monovinylarene lithium compound, A-Li, in which A indicates a polymerized monovinylarene block having an average molecular weight between 5000 and 35000, so as to form a block co-polymer A-B-Li, in which block B substantially comprises polymerized, conjugated diene molecules and in which block A-B has an LVN (limiting viscosity number) between 0.1 and 10 dl/g;

(b) polymerizing a conjugated diene in the presence of an alkyllithium initiator, R-Li, R being an alkyl group, so as to form a polymer block B'-Li substantially comprising polymerized, conjugated diene molecules, polymer block B' having an LVN between 0.1 and 10 dl/g, and the molar ratio X between the initiator R-Li and the compound A-Li being at least 2.5;

(c) coupling the mixture of polymer blocks A-B-Li and B'-Li obtained by the polymerizations mentioned sub (a) and (b) with a coupling agent C which is at least trifunctional as far as its coupling activity is concerned.

The products of the present invention are designed within specific limits in their constitution and proportion so as to obtain the desired results, i.e. improved green strength, building tack, elongation as well as processability.

The conjugated diene present in the polymer blocks B' and A-B may be isoprene or piperylene, but is preferably butadiene. The monovinylarene present in the polymer block A is preferably styrene. The molecular weight of polymer block A is suitably between 15,000 and 25,000 if the copolymer is to be used in non-oil-extended compounds, and between 20,000 and 30,000 if the copolymer is to be used in oil-extended compounds. The blocks B' and B may - and preferably do - also contain a copolymerized monovinylarene, in particular styrene in a minor amount. The amount of monovinylarene thus copolymerized in blocks B' and B may be of the same or different constitution, within the general limits specified above. The LVN of blocks A-B and B' is preferably between 0.2 and 3 dl/g.

The molecular weight of the A block and the LVN of the A-B and B' blocks are determined - after killing the A-Li, A-B-Li and B'-Li blocks, e.g. with methanol and dissolving them in a suitable solvent - by methods known in the art. Thus the molecular weight of the A block may be determined by gel permeation chromatography after calibration with polystyrene of known molecular weight. The LVN is determined in toluene at 30° C. The total styrene of the copolymer is determined by infrared analysis.

The polymer blocks A-B-Li and B'Li are prepared by solution polymerization utilizing the compounds A-Li and R-Li, respectively, as initiators. The alkyl group R preferably contains from 3 to 9 carbon atoms, in particular from 3 to 6 carbon atoms. Isopropyllithium and secondary butyllithium are especially preferred. The compound A-Li, used as the other initiator, may be prepared by polymerization of a monovinylarene in solution in the presence of an alkyl lithium, R-Li, as described. If the desired (number average) molecular weight of the block A is denoted: $M_s$; the grammolar amount of initiator: (R-Li); and the weight in grams of the monovinylarene: (Ar), then the following function exists: $M_s = (Ar)/(R-Li)$. This will serve to calculate the amounts of monovinylarene and alkyllithium required to obtain a block A-Li of the desired molecular weight.

Monomers to be polymerized: the conjugated diene, and, if desired the monovinylarene, are dissolved in a substantially inert solvent such as alkenes, alkanes and cycloalkanes. Suitable species of these include pentane, cyclopentane, hexane, cyclohexane, and mixtures of the same. The polymerization reactions (a) and (b) as well as the coupling reaction (c) may be carried out at 20°–150° C, preferably at 45°–90° C, for 15 minutes to 8 hours, in an inert atmosphere such as under nitrogen. The concentration of the monomers in the reactor is not critical, and is mainly chosen on the basis of the ultimate, practically feasible viscosity of the elastomer solution, solutions of 20% solids content being still stirrable.

The polymerizations may be carried out in the presence of polar compounds such as ethers, amines and other Lewis bases so as to obtain diene blocks having an increased (e.g. 30–60%) vinyl content.

Although the polymerizations according to the invention may be carried out continuously, it is usually more advantageous to effect these batchwise. A preferred method for the copolymerization of a conjugated diene with a minor amount of a monovinylarene so as to prepare the polymer blocks B and B', has been set out in British patent specification 1,283,327. According to this method, first a starting mixture is prepared from the diluent and a part - preferably less than 50%w - of the totally needed quantity of each of the monomers; subsequently initiating the mixture by addition of the initiator R-Li or A-Li; and keeping the monomer ratio in the reaction mixture during copolymerization substantially constant by addition of the remaining part of each of the monomers. By "substantially constant" is meant that the monomer weight ratio during the coplymerization should increase or decrease by not more than 20%.

The two types of polymerizations, (a) and (b) may be carried out separately or in the same reactor. In this connection the following options exist, among others:

(1) the conjugated diene, if desired in the presence of the monovinylarene, is polymerized in separate reactors in the presence of compounds A-Li and R-Li, so as to form the polymer blocks A-B-Li and B'-Li, respectively. The blocks B and B' may be of the same or a different composition, within the limits specified above;

(2) the compound A-Li is first prepared in the diluent by polymerizing the monovinylarene in the presence of an amount, $p$, initiator R-Li. After completion of this polymerization the conjugated diene, if desired the monovinylarene comonomer, and a further amount, $q$, of the same or a different initiator R-Li are added to compound A-Li, formed in the diluent. The amounts of initiator R-Li employed are such that the molar ratio of $q/p$ is at least 2.5. In general, this molar ratio $q/p$ will equal the ratio X. This second method is the preferred method.

Suitably the molar ratio X between R-Li and A-Li is between 2.5 and 10. For use in oil-extended compounds, i.e. in compounds containing 10-100 phr (parts by weight per 100 parts of the non-linear, elastomeric copolymer) of an extender oil, the preferred ratio X or $q/p$ is between 2.6 and 4.5. For use of the copolymer in non-oil-extended compounds — containing less than 10 phr of oil - the preferred ratio X or $q/p$ is between 3 and 6.

If they have been prepared separately, the solutions of the active polymer blocks A-B-Li and B'/Li are mixed. If prepared according to the above preferred second method, these blocks are already available as a mixture, of course. The mixture is coupled by contacting it with the coupling agent C.

The preferred type of coupling agent is a tetrafunctional ester derived from a dicarboxylic acid and a monohydric alcohol. Dimethyl adipate and diethyl adipate are especially suitable for this purpose. Usually these diesters will be used in an about equivalent ratio, i.e. in a molar ratio of (A-B-Li + B'-Li) blocks to diester between 3:1 and 5:1, the equivalent ratio being 4:1.

A number of other polyfunctional coupling agents may be employed in addition to or in place of the preferred diesters. These include polyepoxides, polyisocyanates, polyamines, polyaldehydes, polyanhydrides, polyesters and polyhalides, such as tribromobutane, tin tetrachloride and silicon tetrachloride. Other useful types of coupling agents are alpha-beta-olefinically unsaturated nitriles, in particular acrylonitrile; and certain unsaturated halides such as vinyl chloride, 1-chloro-1,3-butadiene, p-halostyrene and 2-chloro-1-propene. The unsaturated nitriles and halides are generally used in an amount of 0.1-1.5% based on the sum of the weight of the A-B-Li and B'/Li blocks, so as to provide a molar ratio of nitrile or halide to the sum of A-B-Li plus B'/Li of approximately 3-15. It is assumed that under the conditions of the coupling reaction the unsaturated nitrile or halide forms small, polyfunctional end blocks on a part of the A-B- or B'-blocks. Via the pendent nitrile groups or halide atoms the remaining A-B-Li and B'-Li blocks add to form the non-linear, elastomeric copolymers.

Subsequent to the coupling operation, the product may be hydrogenated though, of course, in applications involving vulcanisation with sulphur, such hydrogenation is undesirable.

EXAMPLES

The polymerizations were carried out at 75° C in a 10 liter autoclave charged with 8 l of a 50/50 w/w mixture of cyclohexane and n-hexane. Next an amount of styrene, indicated in the Table, was added and the mixture titrated at room temperature with a 12%w solution of secondary butyllithium (BuLi) in cyclohexane to incipient polymerization, indicated by a temperature rise of 0.1° C. Thereby any impurities present in the solvent mixtures were scavenged. Thereafter, the temperature was raised to and maintained at 75° C, and a further amount of the solution, containing the amount of butyllithium indicated in the Table, was added. After 15 minutes the block A-Li had been formed. Subsequently an initial mixture of styrene/butadiene was added, as indicated in the Table, together with the amount of butyllithium indicated. After these additions, a feed mixture of styrene and butadiene — as indicated in the Table — was added at a constant rate over a period of 3 hours. At the end of the polymerization the amount of DEAP (diethyl adipate) indicated was added at 75° C. After about 2 hours 10 grams of 2,6-ditert.butyl-4-methylphenol was added after which the solvent was removed by steam stripping. The polymer obtained was dried in an oven at 90° C. The results appear from the following Table. In the calculation of molar ratio X between the initiator Bu-Li, added after the A-Li formation, and the Bu-Li, used in the A-Li formation - disregarding the Bu-Li used for scavenging the solvent mixture —, it is assumed that the total amount of Bu-Li used in the A-Li formation will be available as living A-Li blocks.

Black stocks were prepared according to the following recipe:

| Copolymer | 100 | parts by weight |
|---|---|---|
| ZnO | 5 | parts by weight |
| Stearic acid | 3 | parts by weight |
| N-(1,3-dimethylbutyl)-N'-phenyl-p-Phenylenediamine | 1.5 | parts by weight |
| N,N'-bis(1,4-dimethylpentyl)-p-phenylenediamine | 1.5 | parts by weight |
| Paraffin wax | 1 | parts by weight |
| Aromatic extender oil, "Dutrex" 729/HP | 5 | parts by weight |
| ISAF carbon black | 50 | parts by weight |
| Sulphur | 2 | parts by weight |
| N-cyclohexyl-2-benzothiazolsulphenamide | 1 | parts by weight |

The same recipe was used for the "oil-extended" composition, containing 37.5 parts by weight of aromatic extender oil, "DUTREX"729HP, except for the following modifications:

| Sulphur | 1.85 | parts by weight |
|---|---|---|
| N-cyclohexyl-2-benzothiazolsulphenamide | 0.8 | parts by weight |

TABLE

| Experiment | 315 | 317 | 314 | 318 | 303 | 281 | 304 |
|---|---|---|---|---|---|---|---|
| A-Li preparation: | | | b) | | | | |
| Styrene, g | 12 | 24 | 36 | 24 | 36 | 48 | 60 |
| Bu-Li, mmol | 1.2 | 2.4 | 3.6 | 1.2 | 2.4 | 2.4 | 2.4 |
| Mol.wt A-Li, × 10³ | 13 | 10 | 12 | 15 | 15 | 20 | 25 |

TABLE-continued

| Polymerization: | | | | | | | |
|---|---|---|---|---|---|---|---|
| Bu-Li, mmol | 10.8 | 9.6 | 8.4 | 10.8 | 9.6 | 9.6 | 9.6 |
| Ratio, X | 9 | 4 | 2.33 | 9 | 4 | 4 | 4 |
| Initial diene:styrene addition, g: | 31:<br>118<br>313 | 31:<br>110<br>280 | 31:<br>103<br>336 | 31:<br>110<br>138 | 31:<br>103<br>E | 31:<br>95<br>139 | 31:<br>87<br>136 |
| A-Li preparation: | | b) | b) | b) | b) | | b) |
| Styrene, g | 35 | 104 | 144 | — | — | 67 | — |
| Bu-Li, mmol | 1.2 | 3.6 | 7.2 | — | — | 1,75 | — |
| Mol.wt A-Li, × $10^3$ | 29 | 29 | 20 | — | — | 22,5 | — |
| Polymerization: | | | | | | | |
| Bu-Li, mmol | 10.8 | 8.4 | 4.8 | 12 | — | 5.25a) | 7a) |
| Ratio X | 9 | 2.33 | 0.67 | < | — | 3 | < |
| Initial diene:styrene addition, g: | 31:<br>103<br>315 | 31:<br>60<br>317 | 31:<br>35<br>314 | 30:<br>144<br>318 | —<br>303 | 12:26<br>281 | 12:40<br>304 |
| Diene:styrene feed, total, g | 800:<br>188 | 800:<br>176 | 800:<br>164 | 800:<br>176 | 800:<br>164 | 800:<br>152 | 800:<br>140 |
| LVN of (A — B + B'), dl/g | 1.1 | 1.1 | 1.2 | 1.0 | 1.1 | 1.2 | 1.2 |
| Coupling: | | | | | | | |
| DEAP, mmol | 3 | 3 | 3 | 3 | 3 | 3 | 3 |
| Coupling efficiency, % | 82 | 80 | 82 | 78 | 78 | 77 | 75 |
| Copolymer: | | | | | | | |
| LVN of product, dl/g | 1.9 | 1.8 | 2.1 | 1.7 | 1.9 | 1.9 | 2.1 |
| Mooney viscosity | | | | | | | |
| ML 1 + 4 at 100° C | 54 | 55 | >150 | 52 | 76 | 80 | 85 |
| 125° C | 48 | 48 | >150 | 43 | 56 | 58 | 68 |
| | 313 | 280 | 336 | 138 | E | 139 | 136 |
| Diene:styrene feed, total, g | 800:<br>165 | 800:<br>96 | 800:<br>56 | 770:<br>230 | — | 800:<br>133 | 800:<br>200 |
| LVN of (A — B + B'), dl/g | 1.2 | 1.5 | 1.1 | 1.0 | — | 1.8 | 1.7 |
| Coupling: | | | | | | | |
| DEAP, mmol | 3 | 3 | 3 | 3 | — | 3 | 3 |
| Coupling efficiency, % | 77 | 67 | 80 | 75 | — | 60 | 65 |
| Copolymer: | | | | | | | |
| LVN of product, dl/g | 2.1 | 2.3 | 2.0 | 1.7 | 2.0 | 2.9 | 3.0 |
| Mooney viscosity | | | | | | | |
| ML 1 + 4 at 100° C | 75 | >150 | — | 46 | 47 | 44 | 48 |
| 125° C | 64 | 97 | >150 | 26 | — | — | — |
| Experiment | 315 | 317 | 314 | 318 | 303 | 281 | 304 |
| Bound styrene, % | 20 | 20 | 20 | 22 | 20 | 22 | 19 |
| Black stock: | NE | NE | NE | NE | NE | NE | NE |
| Tensile strength, MN/$m^2$ | 0.35 | 0.35 | 0.7 | 0.3 | 0.55 | 0.5 | 0.75 |
| Elongation at break, % | 165 | 265 | 535 | 235 | 450 | 510 | 620 |
| Vulcanisate: | | | | | | | |
| Cure time, min. | 17 | 19 | 21 | 19 | 18 | 11 | 19 |
| Tensile strength, MN/$m^3$ | 21.5 | 20 | 21.5 | 22.5 | 19.5 | 21 | 21.5 |
| 300% Modulus, MN/$m^2$ | 12.5 | 14 | 14 | 11.5 | 14.5 | 15 | 15 |
| Elongation at break, % | 450 | 400 | 420 | 490 | 380 | 390 | 390 |
| Shore A hardness | 64 | 65 | 65 | 60 | 66 | — | 66 |
| Heat build-up, ° C + ) | 37 | 38 | 38 | 39 | 38 | — | 39 |
| | 313 | 280 | 336 | 138 | E | 139 | 136 |
| Bound styrene, % | 19 | 19 | 20 | 23 | 23.5 | 16 | 17 |
| Black stock: | NE | NE | *) | NE | NE | OE | OE |
| Tensile strength, MN/$m^2$ | 0.4 | 1.5 | — | 0.2 | 0.2 | 0.45 | 0.25 |
| Elongation at break, % | 350 | 860 | — | 230 | 450 | 830 | 185 |
| Vulcanisate: | | | | | | | |
| Cure time, min. | 19 | 20 | — | 15 | 30 | — | — |
| Tensile strength, MN/m hu 3 | 18.5 | 19 | — | 22.5 | 26.5 | — | — |
| 300% Modulus, MN/m hu 2 | 15.5 | — | — | 15 | 13.5 | — | — |
| Elongation at break, % | 340 | 280 | — | 400 | 530 | — | — |
| Shore A hardness | 65 | 66 | — | 64 | 60 | — | — |
| Heat build-up,° C +) | 34 | 34 | — | 35 | 39 | — | — |

*) could not be compounded on the mill
E-emulsion SBR
OE-oil extended composition
b)-comparative experiments, not according to the invention.
+) ASTM D 623
NE-non-oil-extended composition
a)-temperature 90°C From the data in the Table it follows that only copolymers having a ratio X of at least 2.5 possess a 100° C-Mooney value within commercially acceptable limits of 40 to 100 in addition to improved green strength. At very high ratios of X the green strength values, i.e. the tensile strength and elongation of the black stock, are undesirably low.

I claim as my invention:

1. A process for the preparation of a non-linear, elastomeric copolymer, which comprises:
    (a) polymerizing a conjugated diene in the presence of a polyvinylarene lithium compound, A-Li, in which A indicates a polymerized monovinylarene block, having an average molecular weight between 5000 and 35000, so as to form a block copolymer A-B-Li, in which block B substantially comprises polymerized, conjugated diene molecules and in which block A-B has an LVN between 0.1 and 10 dl/g;
    (b) polymerizing a conjugated diene in the presence of an alkyllithium initiator, R-Li, R being an alkyl group, so as to form a polymer block B'-Li, block B' having an LVN between 0.1 and 10 dl/g, and the molar ratio X between the initiator R-Li and the compound A-Li being at least 2.5;

(c) coupling the mixture of polymer blocks A-B-Li and B'-Li obtained by the polymerizations mentioned sub (a) and (b) with a coupling agent C which is at least trifunctional in so far as its coupling activity is concerned.

2. A process according to claim 1, in which the block A of the polyvinylarene lithium compound used has an average molecular weight between 15,000 and 30,000.

3. A process according to claim 1, in which block A-B and/or block B' have an LVN between 0.2 and 3 dl/g.

4. A process according to claim 1, in which A-Li is polystyrl lithium compound, A being a polymerized styrene block.

5. A process according to claim 1, in which the conjugated diene is butadiene.

6. A process according to claim 1, in which the polymer blocks B and B' contain a minor amount of copolymerized monovinylarene.

7. A process according to claim 6, in which first a starting mixture is formed from a diluent and less than 50%w of the conjugated diene and the monovinylarene, subsequently initiating the mixture by addition of the initiator R-Li or A-Li, and keeping the monomer ratio in the reaction mixture during copolymerization substantially constant by addition of the remaining part of each of the monomers.

8. A process according to claim 1, in which the compound A-Li is first prepared in a diluent by polymerizing the monovinylarene in the presence of an amount, $p$, of the initiator R-Li, subsequently adding the conjugated diene and a further amount, $q$, of the initiator R-Li to compound A-Li formed in the diluent, R being an alkyl group and the molar ratio of $q/p$ being at least 2.5, so as to form the mixture of polymer blocks A-B-Li and B'-Li.

9. A process according to claim 1 in which the ratio X is between 2.5 and 10.

10. A non-linear, elastomeric copolymer, prepared by a process according to claim 1.

11. A process according to claim 1 wherein the coupling agent C is dimethyl adipate.

* * * * *